(12) United States Patent
Saitoh

(10) Patent No.: US 6,478,280 B2
(45) Date of Patent: Nov. 12, 2002

(54) SEAT SLIDING APPARATUS AND RESIN SLIDER

(75) Inventor: Takashi Saitoh, Shizuoka (JP)

(73) Assignee: Fuji-Kiko Co., Ltd., Kosai (JP)

( * ) Notice: Subject to any disclaimer, the term of this patent is extended or adjusted under 35 U.S.C. 154(b) by 0 days.

(21) Appl. No.: 09/725,275

(22) Filed: Nov. 29, 2000

(65) Prior Publication Data

US 2001/0024058 A1 Sep. 27, 2001

(30) Foreign Application Priority Data

Mar. 22, 2000 (JP) .................................. 2000-079418

(51) Int. Cl.[7] .............................................. A47C 1/023
(52) U.S. Cl. .................................. 248/429; 248/430
(58) Field of Search .................. 297/344, 11; 248/429, 248/430

(56) References Cited

U.S. PATENT DOCUMENTS

| | | | | |
|---|---|---|---|---|
| 4,556,186 A | * | 12/1985 | Langmesser, Jr. et al. | 248/429 |
| 4,756,503 A | * | 7/1988 | Fujita | 248/430 |
| 4,811,925 A | * | 3/1989 | Fujita et al. | 248/430 |
| 5,407,166 A | * | 4/1995 | Pilarski | 248/430 |
| 5,447,352 A | * | 9/1995 | Ito et al. | 248/429 X |
| 5,575,449 A | * | 11/1996 | Shinbori et al. | 248/429 |
| 5,641,146 A | * | 6/1997 | Hoshihara et al. | 248/430 |
| 5,741,000 A | * | 4/1998 | Goodbred | 248/429 X |
| 5,746,409 A | * | 5/1998 | Rees | 248/429 X |
| 5,765,798 A | * | 6/1998 | Isomura | 248/429 X |
| 5,860,319 A | * | 1/1999 | Via | 248/429 X |
| 6,089,521 A | * | 7/2000 | Tarasawa et al. | 248/430 |

FOREIGN PATENT DOCUMENTS

JP 06278508 A * 10/1994 .................. 248/430

* cited by examiner

Primary Examiner—Rodney B. White
(74) Attorney, Agent, or Firm—Foley & Lardner

(57) ABSTRACT

A seat sliding apparatus has left and right rail pairs each including an upper rail for supporting a seat and a lower rail for fixing to a vehicle body. In each of the left and right rail pairs, left and right resin sliders are attached to lateral edges of the upper or lower rails, to facilitate sliding motion of the upper rail along the lower rail. Each resin slider has a larger engaging portion and a smaller engaging portion. The left and right resin sliders are arranged in parallel to each other, but extended in opposite direction, so that the larger engaging portion is ahead of the smaller engaging portion in one of the left and right resin slider whereas, in the other resin slider, smaller engaging portion is ahead of the larger engaging portion.

7 Claims, 5 Drawing Sheets

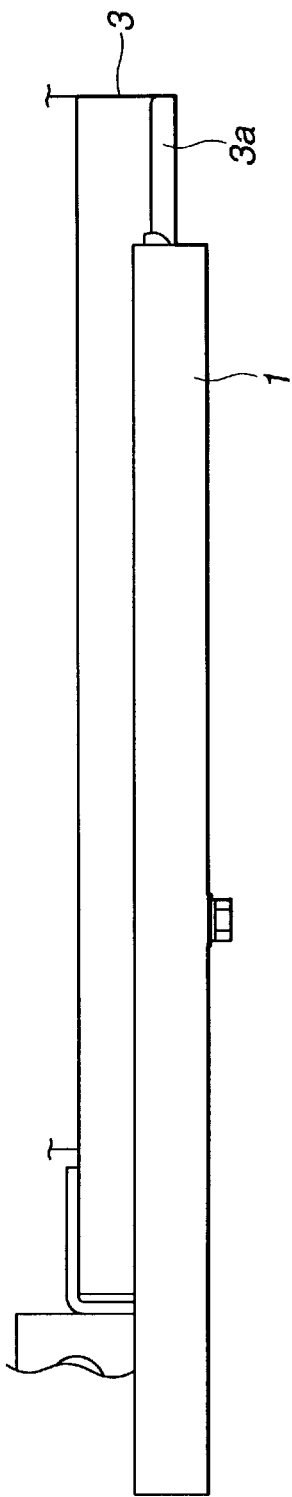
FIG.4
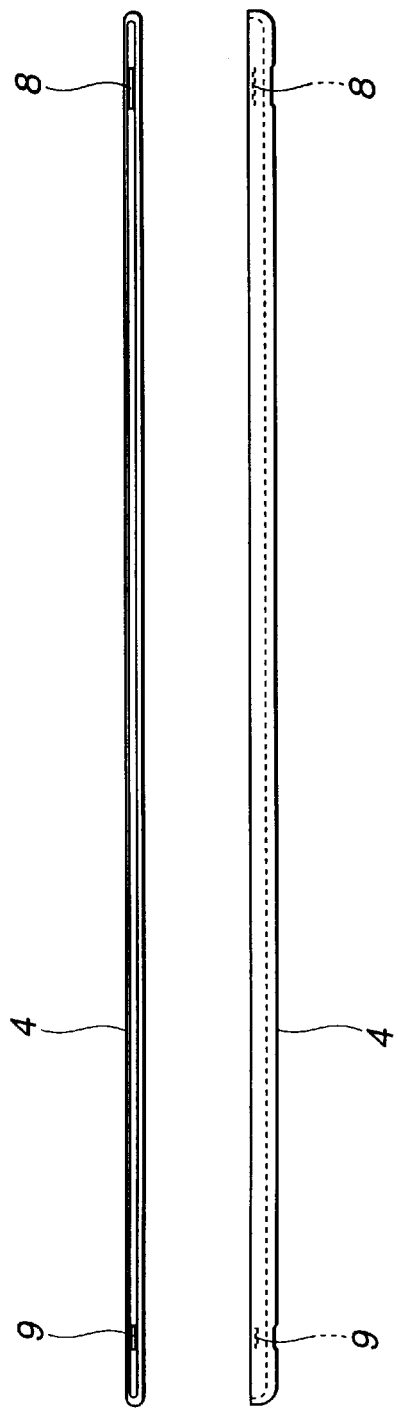
FIG.5A
FIG.5B

SEAT SLIDING APPARATUS AND RESIN SLIDER

BACKGROUND OF THE INVENTION

The present invention relates to a seat sliding apparatus for a vehicle, and more particularly to a resin slider interposed between an upper rail and a lower rail of a seat sliding apparatus, and an assembled structure of resin sliders and upper and lower rails.

A seat sliding apparatus includes a pair of left and right lower rails secured to a vehicle body through supporting legs, a pair of left and right upper rails engaged with the left and right lower rails, respectively, in such a slidable manner that the upper rail can slide on the lower rail along the longitudinal direction on each of the left and right sides. A vehicle seat is fixedly mounted on the upper rails. A slide lock mechanism is arranged to allow the upper rails to slide along the lower rails to adjust the seat to a desired position, and to lock the upper rails to secure the seat at the desired position.

There are various types of slide rail mechanisms having different cross sectional shapes and different rail engaging structures. FIGS. 7 and 8 show a widely used type of earlier technology. A lower rail 1 has a channel section, rollers 2 are disposed on the inner bottom of the lower rail 1, and an upper rail 3 having a generally inverted-U section is placed on the rollers 2 in an inverted position.

Left and right resin sliders 4 are interposed between the upper and lower rails, to eliminate or reduce vibrations due to looseness, and noise due to metal-to-metal contact during vehicle movement or seat sliding operation, and to reduce the friction for smooth sliding motion. The lower rail 1 has left and right inward flanges 1a each having a downwardly bent edge. The upper rail 3 is placed between the left and right inward flanges 1a of the lower rail 1. The upper rail 3 has left and right outward flanges 3a each having an upwardly bent edge. The resin sliders 4 are interposed between the inward flanges 1a of the lower rail 1 and the outward flanges 3a of the upper rail 3. Each resin slider 4 is attached, at each of front and rear end portions, to the left or right downward edge of the inward flange 1a by engagement between an engaging hole 5 formed in the inward flange 1a and an engaging portion 7 formed in the resin slider 4. Each engaging portion 7 has a hook portion 6.

SUMMARY OF THE INVENTION

To meet the demand for size reduction of the seat sliding apparatus, some resin sliders are so shaped as to have an asymmetrical cross section having unequal left and right halves. When, for example, the distance between each upright wall of the upper rail 3 and the adjacent downward edge of the lower rail is made smaller for size reduction, a resin slider can be made asymmetric to have a thin wall section on the inner side of the downward edge of the lower rail and a thick wall section on the outer side. In the case of such asymmetric resin sliders, the error of mistaking a resin slider for the right side for a resin slider for the left side can cause defects seriously affecting the sliding motion of an upper rail. When asymmetrical resin sliders of a single kind are used for the left and right sides, similar troubles can arise if the front and rear ends of a resin slider are placed oppositely by mistake. Once a resin slider is attached, removal of the resin slider is not possible without breaking its hook portion. Therefore, a setup error of a resin slider increases the production cost. Means for preventing mistaken setup, such as a projection or a tape on a resin slider for indicating the orientation by the sense of touch or sight would increase the production cost by the need for addition production steps. The use of resin sliders of two different kinds for the left side and the right side requires two different metal molds or dies for forming two different sliders.

It is, therefore, an object of the present invention to provide a resin slider, and a seat sliding apparatus or mechanism including resin sliders which are designed to facilitate assembly process and preventing mistaken setup.

A seat sliding apparatus comprises at least one rail pair of first and second rails engaged with each other so that one is slidable on the other, and first and second resin sliders interposed between the first and second rails. Each of the first and second rails extends longitudinally from a first longitudinal rail end (such as a front or rear end) to a second longitudinal rail end (such as a rear or front end) along each other. One of the first and second rails is a lower rail to be fixed to a vehicle body, and the other is an upper rail to be fixed to a seat. The first rail comprises first and second side portions, such as flanges or edges, each extending along the first rail and each comprising first and second unequal engaging holes spaced from each other along the first rail. The first engaging hole is located in front of the second engaging hole in the first side portion whereas, in the second side portion, the second engaging hole is located in front of the first engaging hole.

The first and second resin sliders are attached, respectively, to first and second side portions of the first rail. Each of the first and second resin sliders comprises first and second unequal engaging portions spaced along the first rail, and engaged, respectively, with the first and second engaging holes of one of the first and second side portions. The first engaging portion in the first resin slider is located in front of the second engaging portion along the first rail whereas, in the second resin slider, the second engaging portion is located in front of the first engaging portion along the first rail.

BRIEF DESCRIPTION OF THE DRAWINGS

FIG. 4 is a side view of the lower rail and the upper rail of FIG. 1.

FIG. 5A is a plan view showing one of the resin sliders in the seat sliding apparatus of FIG. 1.

FIG. 5B is a front view of the resin slider of FIG. 5A.

DETAILED DESCRIPTION OF THE INVENTION

Figure 1:
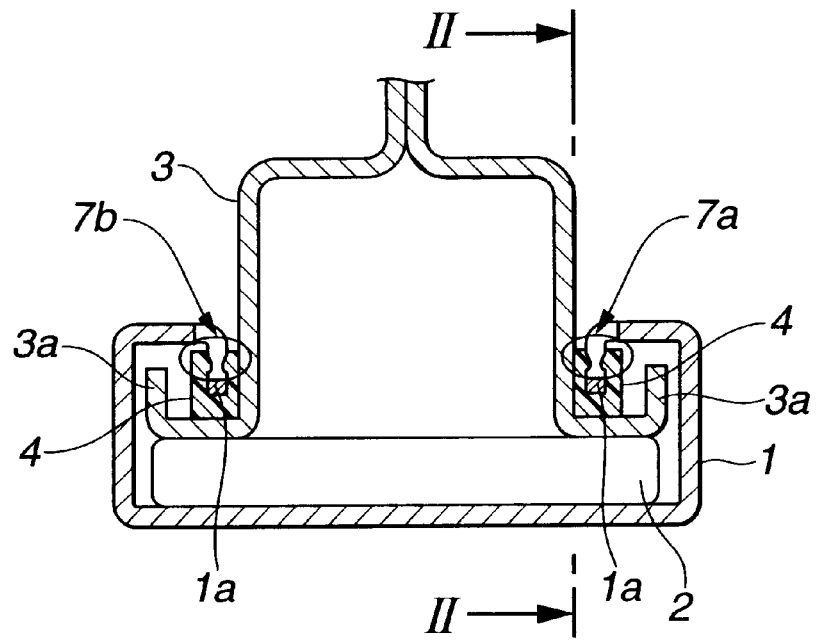
FIG. 1 is a sectional view of a lower rail and an upper rail in a seat sliding apparatus according to the embodiment of the present invention.

FIGS. 1–4 show one of left and right side rail pairs each including a lower rail 1 and an upper rail 3. The lower rail 1 in this example as shown in FIG. 1 is a long panel or sheet member shaped to have a channel-shaped cross section. The lower rail 1 has left and right side inward flanges 1a bent inward toward each other. A plurality of rollers 2 are placed on a bottom wall of the lower rail 1 between left and right upright walls. The rollers 2 facilitate the sliding motion of the upper rail 3 by rolling on the bottom wall in the lower rail 1. The upper rail 3 is a long panel or sheet member shaped to have a U-shaped cross section in an inverted posture. The upper rail 3 has left and right vertical walls disposed between the left and right inward flanges 1a of the lower rail 1, and left and right outward flanges 3a bent outward under the left and right inward flanges 1a of the lower rail 1 so that the upper rail 3 is engaged with the lower rail 1. Each of the left and right side outward flanges 3a has a lower flat portion for rolling on the rollers 2, and an upward bent edge. Each of the left and right side inward flanges 1a of the lower rail 1 has an upper flat portion and the downward bent edge. On each of the left and right sides, the downward edge of the inward flange 1a of the lower rail 1 is located between the adjacent vertical wall and the upward edge of the outward flange 3a of the upper rail 3.

Left and right resin sliders 4 in this example are long members of resin attached to the downward edges of the left and right inward flanges 1a of the lower rail 1, respectively. Each resin slider 4 has a thick upright wall section, a thin upright wall and a lower portion connecting the lower ends of the thick and thin upright wall sections so as to form a generally U-shaped cross section. The thin upright wall section is disposed between the downward edge of the inward flange 1a of the lower rail 1 and the adjacent upright side wall of the upper rail 3. The 5 thick upright wall section of the resin slider 4 is disposed between the downward edge of the inward flange 1a of the lower rail 1 and the upward edge of the outward flange 3a of the upper rail 3. As viewed in FIG. 1, the thin wall sections of the left and right resin sliders 4 are placed between the thick wall sections of the left and right resin sliders 4. Both (front and rear) ends of each resin slider 4 are closed.

Figure 2:
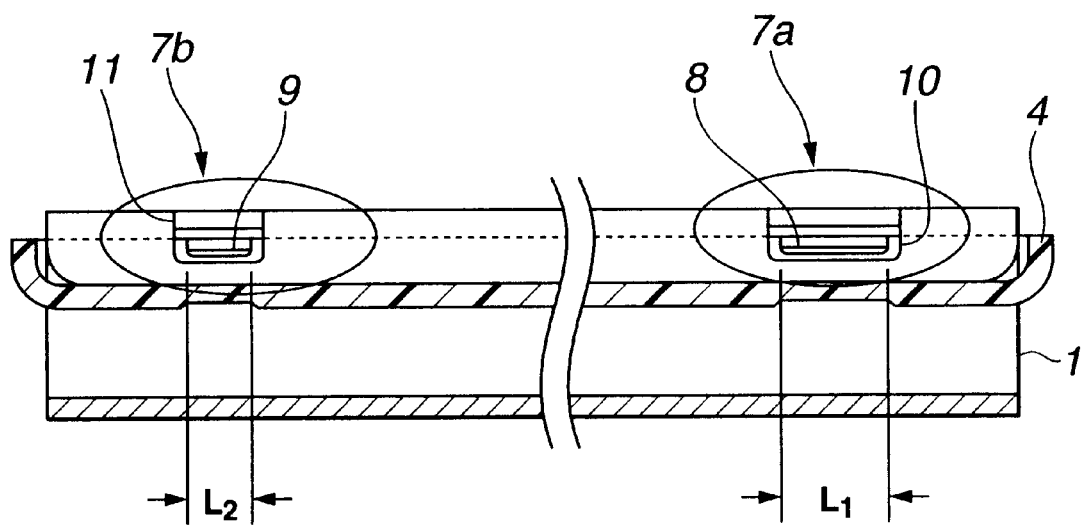
FIG. 2 is a sectional view taken along line "II—II" of FIG. 1.
Figure 6A:
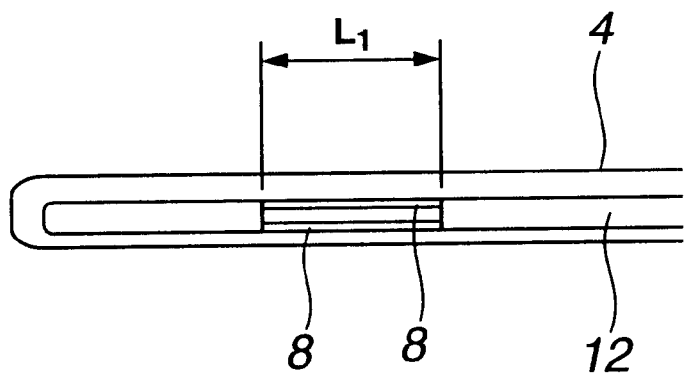
FIG. 6A is an enlarged plan view showing one end portion of the resin slider of FIGS. 5A and 5B.
Figure 6B:
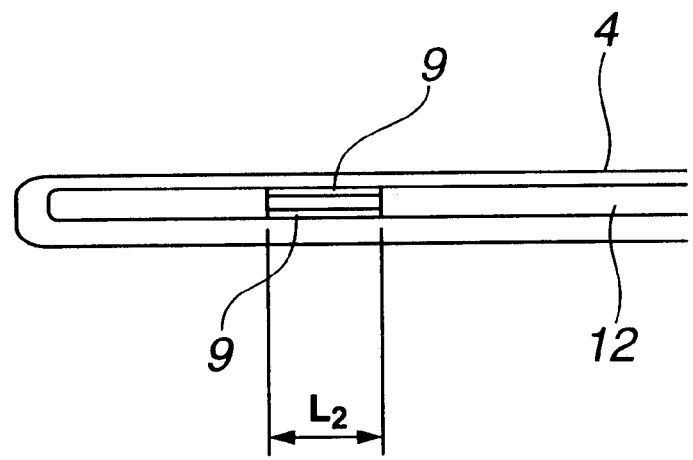
FIG. 6B is an enlarged plan view showing the other end portion of the resin slider of FIGS. 5A and 5B.
Figure 6C:
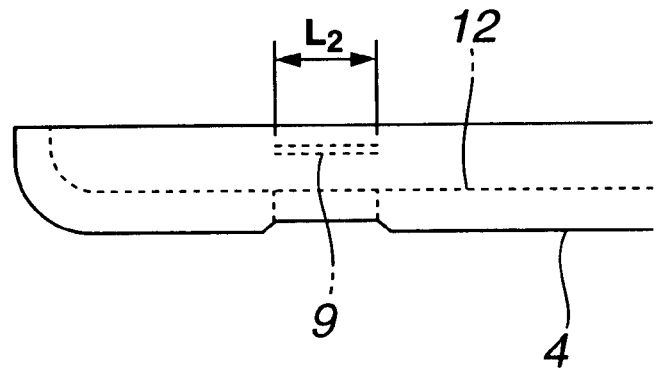
FIG. 6C is an enlarged front view showing the end portion of FIG. 6B.
Figure 7:
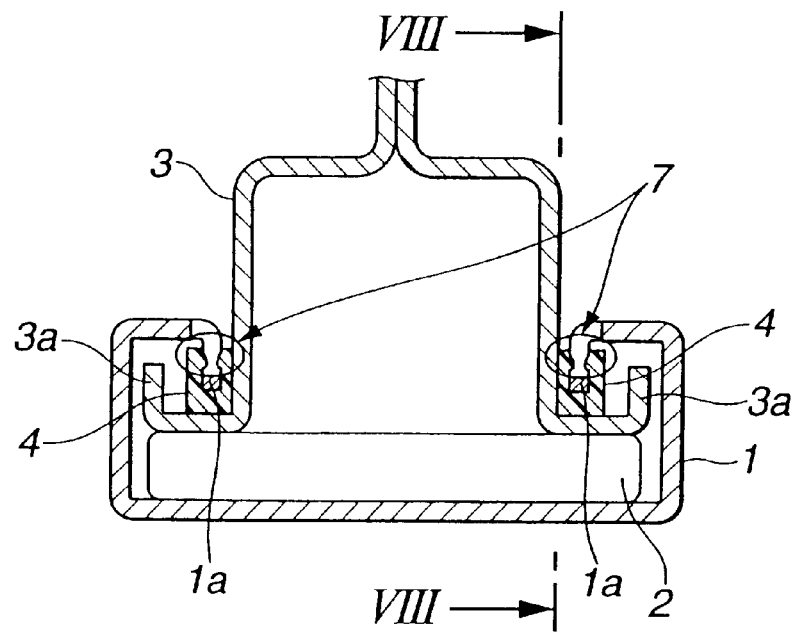
FIG. 7 is a sectional view of a lower rail and an upper rail in a seat sliding apparatus of earlier technology.
Figure 8:
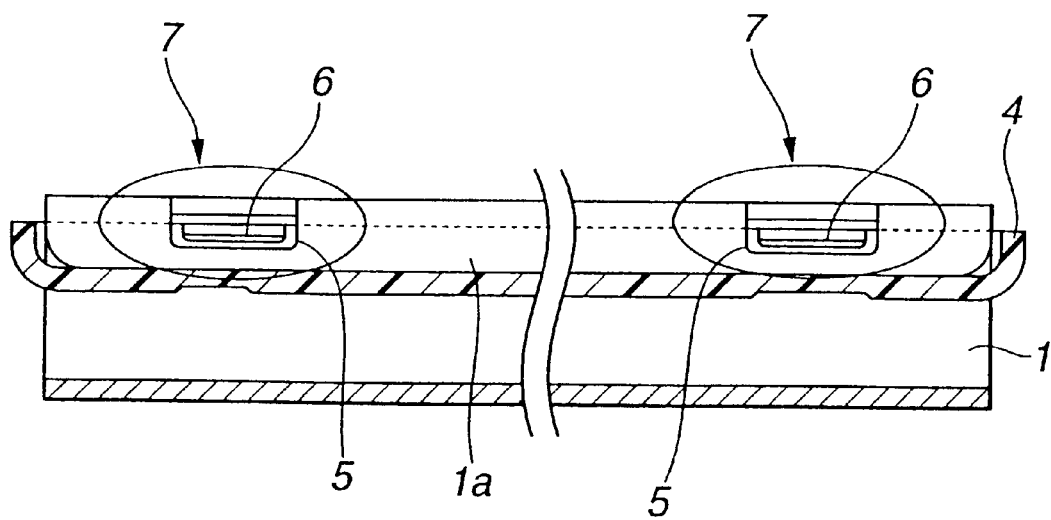
FIG. 8 is a sectional view taken along line "VIII-VIII" of FIG. 7.

As shown in FIG. 2, each resin slider 4 extends longitudinally from a first longitudinal end to a second longitudinal end, and has large and small engaging portions 7a and 7b formed near the first and second longitudinal ends, respectively. As shown in FIGS. 5A and 5B, the large engaging portion 7a includes two large hook portions 8, and the small engaging portion 7b includes two small hook portions 9. As shown in FIGS. 6A, 6B and 6C, in this example, the difference between the large hook portions 8 and the small hook portions 9 resides only in the difference in width. The width L1 of the large hook portions 8, as measured along the longitudinal direction of the resin slider 4, is greater than the width L2 of the small hook portions 9. The large and small hook portions 8 and 9 are substantially identical in shape as shown in FIG. 1. Each resin slider 4 has a groove 12 extending longitudinally between the first and second longitudinal ends. In each of the large and small engaging portions 7a and 7b, the large or small hook portions 8 or 9 are two confronting rectangular projections projecting toward each other from the opposite upright wall sections in the groove 12.

Each of the left and right inward flanges 1a of the lower rail 1 extends longitudinally from a first longitudinal end of the lower rail to a second longitudinal end, and each (left or right) inward flange 1a has large and small engaging holes 10 and 11 corresponding to the large and small engaging portions 7a and 7b. The large and small engaging holes 10 and 11 are, respectively, formed in the vicinity of the first and second longitudinal ends of the lower rail 1. The difference between the large and small engaging holes 10 and 11 resides only in the size. The large engaging hole 10 has a width (or dimension along the longitudinal direction) for snugly receiving the large hook portions 8 having the width L1. The small engaging hole 11 has a width for snugly receiving the small hook portions 9 having the width L2.

Figure 3:
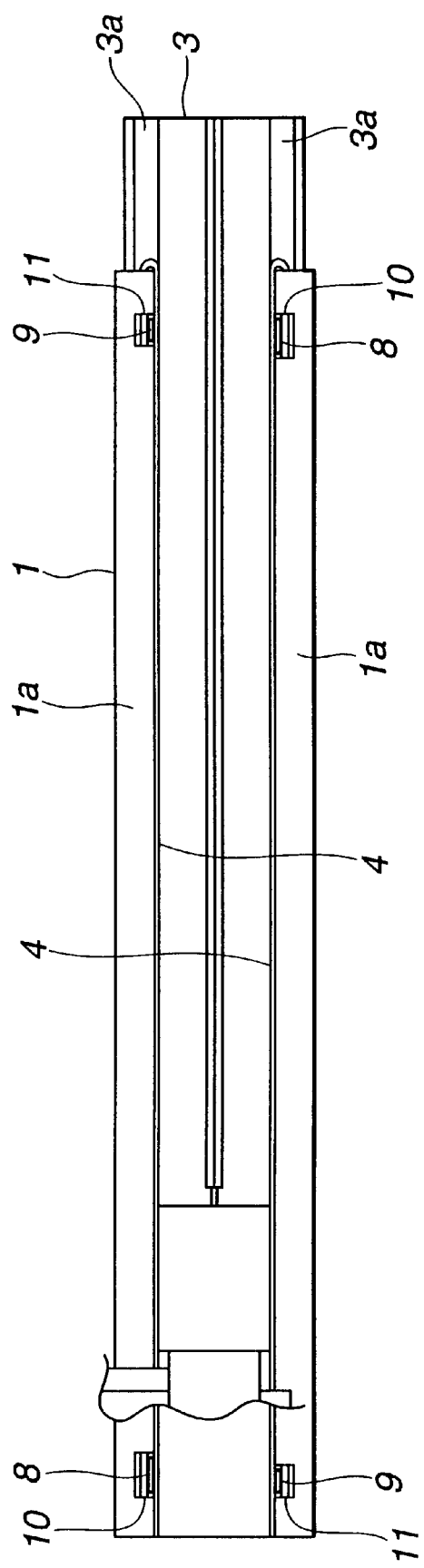
FIG. 3 is a plan view of the lower rail and the upper rail of FIG. 1.

As shown in FIG. 3, the large and small engaging holes 10 and 11 are formed, near the first longitudinal end of the lower rail 1, respectively, in the left and right side inward flanges 1a. The small and large engaging holes 11 and 10 are formed, near the second longitudinal end of the lower rail 1, respectively, in the left and right side inward flanges 1a. The two large engaging holes 10 and the two small engaging holes 11 are arranged at the four vertexes of a rectangle in a manner of central symmetry about the center of symmetry located at the middle of a center line of the lower rail 1 between the first and second longitudinal ends. The two large engaging portions 10 are arranged at diagonally opposite positions, and the two small engaging portions 11 are arranged at diagonally opposite positions. One of the left and right inward flanges 1a has the large engaging portion 10 near the front longitudinal end of the lower rail 1, and the small engaging portion 11 near the rear longitudinal end of the lower rail 1, whereas the other of the left and right inward flanges 1a has the small engaging portion 11 near the front longitudinal end of the lower rail 1, and the large engaging portion 11 near the rear longitudinal end of the lower rail 1.

One resin slider 4 is attached to one of the left and right inward flanges 1a of the lower rail 1 by pushing the resin slider 4 to insert the downward edge of the inward flange 1a into the groove 12 of the resin slider 4. In this case, the large and small hook portions 8 and 9 of the resin slider 4 are fit, respectively, into the large and small engaging holes 10 and 11, and the resin slider 4 is secured to the inward flange 1a correctly. If the resin slider 4 is pushed in such a wrong manner that the large hook portions 8 are set to the small engaging hole 10 and the small hook portions 9 are set to the large engaging hole 11, then the large hook portions 8 can not fit into the small engaging hole 11 though the small hook portions 9 can fit into the large engaging hole 10. Therefore, the arrangement of this embodiment can reliably prevent wrong setting of a resin slider, facilitate the assembly process, and ensure correct setting in which the thin wall section of the resin slider is on the correct side.

Thereafter, another resin slider 4 is attached to the other of the left and right inward flanges 1a of the lower rail 1 by turning the resin slider 4 around and pushing the resin slider 4 to insert the edge of the inward flange 1a into the groove 12. The large and small hook portions 8 and 9 of the resin slider 4 are correctly engaged into the large and small engaging holes 10 and 11 when the resin slider 4 is turned around correctly.

Thus, the seat slide structure according to the embodiment of the present invention eliminates the need for resin sliders of two different kinds. Resin sliders needed in the embodiment are of one and the same kind.

The diagonally opposite arrangement of the large and small engaging holes 10 and 11 ensures the correct setup of two resin sliders in which the large engaging hole 10 of a first resin slider, and the small engaging hole 11 of a second resin slider are paired near the front end of the lower rail, and the small engaging hole 11 of the first resin slider, and the large engaging hole 10 of the second resin slider are paired near the rear end of the lower rail.

In the illustrated embodiment, the resin sliders 4 are attached to the lower rails 1. However, the present invention is not limited to this. Resin sliders 4 may be attached to upper rails 3.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat sliding apparatus comprising:

at least one rail pair of first and second rails engaged with each other so that one is slidable on the other, each of the first and second rails extending longitudinally from a first longitudinal rail end to a second longitudinal rail end along each other, one of the first and second rails being a lower rail adapted to be fixed to a vehicle body, the other of the first and second rails being an upper rail adapted to be fixed to a seat, the first rail comprising first and second side portions each extending along the first rail and each comprising first and second unequal engaging holes which are spaced from each other along the first rail and which are unequal in size, the first engaging hole being located in front of the second engaging hole in the first side portion whereas, in the second side portion, the second engaging hole is located in front of the first engaging hole; and two pairs of first and second resin sliders interposed between the first and second rails, and attached, respectively, to the first and second side portions of the first rail, each of the first and second resin sliders comprising first and second unequal engaging portions which are unequal in size, which are spaced along the first rail, and which are engaged, respectively, with the first and second engaging holes of one of the first and second side portions, the first engaging portion in the first resin slider being located in front of the second engaging portion along the first rail whereas, in the second resin slider, the second engaging portion is located in front of the first engaging portion along the first rail.

2. The seat sliding apparatus as claimed in claim 1, wherein the first engaging holes are so sized to each accept one of the first engaging portions whereas the second engaging holes are so sized to reject each of the first engaging portions.

3. The seat sliding apparatus as claimed in claim 2, wherein the first and second resin sliders are substantially identical in size and shape, each of the first and second resin sliders extends longitudinally from a first longitudinal slider end to a second longitudinal slider end, the first engaging portion of each resin slider being located, along a longitudinal direction of the resin slider, between the first longitudinal slider end and the second engaging portion, and the second engaging portion of each resin slider being located, along the longitudinal direction of the resin slider, between the first engaging portion and the second longitudinal slider end, and the first and second resin sliders are placed in parallel to each other but in opposite directions.

4. The seat sliding apparatus as claimed in claim 1, wherein the first engaging holes are longer, as measured a long the first rail, than the second engaging holes, and the first engaging portion s are longer, as measured along the first rail, than the second engaging portions.

5. The seat sliding apparatus as claimed in claim 4, wherein each of the resin sliders has a U-shaped cross section, and comprises a thick wall section and a thin wall section which are placed on opposite sides of one of the first and second side portions of the first rail, and each of the engaging portions of each resin slider comprises an inward projection projecting from one of the thick wall section and the thin wall section toward the other and fitting in one of the engaging holes, and the inward projections of the first engaging portions of the resin sliders are longer, as measured along the first rail, than the inward projections of the second engaging portions of the resin sliders.

6. A resin slider for interposition between first and second rails of a seat sliding apparatus, the resin slider comprising:

first and second unequal wall sections defining a groove therebetween for receiving a rail edge of the first rail of the seat sliding apparatus, the first and second unequal wall sections being unequal in size; and first and second unequal engaging portions which are spaced from each other along a longitudinal direction of the resin slider and which are unequal in size, the first engaging portion being adapted to engage with a first engaging hole formed in the rail edge of the first rail, the second engaging portion being adapted to engage with a second engaging hole formed in the rail edge of the first rail.

7. The resin slider as claimed in claim 6, wherein the first engaging portion is larger in size than the second engaging portion.

\* \* \* \* \*